United States Patent [19]

Anglin et al.

[11] Patent Number: 5,164,576
[45] Date of Patent: Nov. 17, 1992

[54] CARD READER APPARATUS WITH REPLACABLE CARD GUIDE

[75] Inventors: Noah L. Anglin, San Jose; Stanley J. Hludzinski, Auburn, both of Calif.

[73] Assignee: VeriFone, Inc., Redwood City, Calif.

[21] Appl. No.: 617,344

[22] Filed: Nov. 23, 1990

[51] Int. Cl.⁵ .................. G06K 13/06; G06K 13/24
[52] U.S. Cl. ........................... 235/483; 235/449; 235/482
[58] Field of Search ............ 235/449, 482, 483; 360/2

[56] References Cited

U.S. PATENT DOCUMENTS

| | | | |
|---|---|---|---|
| 4,585,929 | 4/1986 | Brown et al. | 235/483 |
| 4,788,420 | 11/1988 | Chang et al. | 235/483 |
| 4,795,891 | 1/1989 | Morigaki | 235/483 |

*Primary Examiner*—Harold Pitts

*Attorney, Agent, or Firm*—Lowell C. Bergstedt

[57] ABSTRACT

A point of sale terminal having a reader assembly for reading a data card having data stored on at least one data track thereon. The terminal includes a housing defining a guide slot location for the data carrier and a transducer for detecting data stored on the data track. A removable guide element is mounted to the housing at the data carrier slot location. This guide element has at least a bottom wall portion defining a bottom guide surface of a guide for the data card and one major side wall portion defining one side guide surface of a guide slot. An access window is formed in the major side wall portion. A mounting arrangement mounts the transducer at a prearranged location within the access window for accurate detection of data stored on the data track as the data card is manually swiped through the guide slot.

7 Claims, 7 Drawing Sheets

CARD READER APPARATUS WITH REPLACABLE CARD GUIDE

FIELD OF THE INVENTION

This invention relates generally to apparatus for reading data tracks on data carriers. More specifically, this invention relates to a data carrier reader subassembly with a replacable and interchangable card guide element for use in apparatus, such as a point of sale terminal.

BACKGROUND AND PRIOR ART

Chang et al. U.S. Pat. No. 4,788,420, entitled "System and Method for Reading Data Record Stripes on Data Cards," discloses one form of prior art point of sale terminal which incorporates a card reader assembly. The Chang et al. terminal utilizes a card guide which is integrally molded into the terminal case. A metal wear strip is molded into the bottom of the card guide slot to provide a surface which has better wear characteristics than the plastic material from which the terminal housing is formed in an injection molding process. In other prior art terminals, a separate metal wear strip is fastened to the terminal housing to form the bottom wall of a card guide slot to provide longer wear characteristics.

Kobayashi et al. U.S. Pat. No. 4,304,992, entitled "Magnetic Card Reader" discloses (FIGS. 4-6) a card reader in the form of a separate module with a housing that defines the card slot and encloses both the read head and decoder electronics for processing signals from the read head as a card is wiped through the slot. The card reader module is designed to be mounted to a point of sale terminal to provide a card reading function.

It is also known in the prior art to provide complete card reader subassemblies (i.e. with read head and decoder electronics together in a separate housing) that are designed to be physically integrated into the case of a point of sale terminal.

OBJECTS OF THE INVENTION

It is the principal object of this invention to provide an improved reader assembly for a data carrier such as a data card.

It is another object of this invention to provide a data carrier reader subassembly that can be utilized interchangably in various types of systems.

It is another object of this invention to provide a reader subassembly in the form of a removable, replacable data carrier guide element.

It is another object of this invention to provide a card reader assembly for an injection molded housing which incorporates a separate card guide formed from a material with higher wear resistance.

It is another object of this invention to provide a card reader assembly for a terminal in which the card guide and read head assembly are removably mounted to a terminal case.

It is another object of this invention to provide a card reader with a removable card guide assembly having an improved read head mounting arrangement.

It is another object of this invention to provide an improved point of sale terminal with a replacable card guide assembly.

It is another object of this invention to provide a card reader assembly that is readily configured for selectably reading one or a pair of different data tracks on a data card.

FEATURES AND ADVANTAGES OF THE INVENTION

This invention features a data carrier reading subassembly for reading data stored on a data carrier which has at least one data track thereon. The reading assembly is adapted for use with a housing which defines a data carrier slot location and incorporates a transducer for detecting the data stored on the data track. A guide is removably mounted to the housing means at the data carrier slot location. The guide has at least a bottom wall portion defining a bottom guide surface of a guide slot for the data carrier or data card and one major side wall portion defining one side guide surface of a guide slot for the data carrier and also defining an access window. A mounting arrangement mounts the transducer at a prearranged location within the access window for accurate detection of data stored on the data track of a data carrier being manually swiped through the guide slot.

The removably mounted guide element for the data carrier or data card provides the advantage that this component becomes a replacable part if it malfunctions or is damaged. It also provides a data card guide which can be used interchangably on a variety of terminals and card reader products. With such interchangability between multiple products, costs associated with designing individual modules for each product are avoided. Furthermore, the parts of the card reader subassembly of this invention can be purchased in larger quantities at reduced individual part prices.

Preferably the terminal housing is an injection molded housing formed from a plastic material that is inexpensive and easy to injection mold and meets testing laboratory standards for equipment of this type, but does not have sufficient wear resistance characteristics to serve as the acting wall surface of a card slot. The guide element is preferably formed from a plastic material that has a substantially greater wear resistance characteristic and thus functions well as the material forming the acting card guide surfaces.

In a preferred embodiment of this invention, the housing includes at least one partial side wall portion at the guide slot location which defines a rectangular aperture having an open bottom. The card guide has at least one major side wall portion which defines a mounting wall portion substantially matching the rectangular aperture. Each of the respective edge sections of the partial side wall portion adjacent the rectangular aperture and the mounting wall portion of the card guide define one of a cooperative tongue and groove arrangement such that the mounting wall portion of the card guide may be slidably inserted into the rectangular aperture with the cooperative tongue and groove removably mounting the guide means to the housing.

This mounting arrangement provides a secure and well registered mounting location for the card guide element at the defined card guide location with the replacable card guide element serving as the acting card slot in the card reading region of the terminal which is the major wear point.

The card guide element preferably has two major side wall portions and a bottom wall portion forming the entire side and bottom walls of the acting card slot. This provides the greatest wearability of the card reader subassembly of this invention.

In a specific embodiment of this invention, the data carrier has first and second separated data tracks thereon at prearranged first and second distances from a bottom edge of the carrier. The transducer includes at least one read element for reading one of the data tracks and being positioned at a prearranged location. The mounting arrangement comprises a bracket and fastener arrangement for selectively mounting the bracket on the guide in one of a first orientation and second orientation inverted from the first orientation. The fastener cooperates with the guide to define a reference mounting line relative to each of the bracket and the guide at a prearranged distance from the bottom guide surface of the card guide. The prearranged distance corresponds substantially to the average of the first and second distances previously mentioned. The bracket carries the transducer in a prearranged position with the one read element displaced from the reference mounting line by a prearranged displacement distance corresponding substantially to one half the difference between the first and second distances. In this manner the one read element is positioned to read the first data track when the bracket is mounted in the first orientation and the one read element is positioned to read the second data track when the bracket is mounted in the second orientation.

This feature provides the advantage of enabling a single subassembly design to serve as a reader for alternative data tracks. This avoids the requirement of designing and stocking custom parts for each type of data track reading requirement.

In addition, when the read head has two separated reading elements and the data card has three possible data tracks, the mounting arrangement of this invention provides for mounting the transducer with one of the reading elements substantially at the reference mounting line such that the two respectively inverted mounting positions for the bracket enable the read head to be selectively positioned to read the upper pair of data tracks or the lower pair of data tracks. This feature of the invention permits a single data card reader design to handle both two track reading requirements.

In another embodiment of this invention, the bottom wall portion of the card guide element is adapted to receive and mount a wall insert member having a thickness which alters the position of the bottom wall of the guide slot relative to the read head. In this manner, the data carrier subassembly of this invention provides for a single general card slot design to handle several data track reading requirements. This feature may be used for selectively reading one of two data tracks using a read head with a single pickup element or for selectively reading one adjacent pair of three defined data tracks using a read head with two pickup elements thereon. Using this feature of this invention, the entire card reader subassembly or the entire terminal can be assembled for one reading arrangement and then altered to serve the other reading arrangement if needed.

Another feature of this invention involves use of a card guide with a bottom wall portion of the guide slot having an upper surface tapering downwardly from a point directly underneath the transducer. This provides the advantage, especially important in short card guide slots, that a data card being swiped through the guide slot is more likely to have sufficiently accurate registration between each detector element on the read head and the associated data track for accurate detection of data thereon even if the card is positioned at an angle.

Other objects, features and advantages of this invention will be apparent from a consideration of the detailed description of various embodiments set forth below in conjunction with the accompanying drawings.

DETAILED DESCRIPTION OF INVENTION EMBODIMENTS

Figure 1:
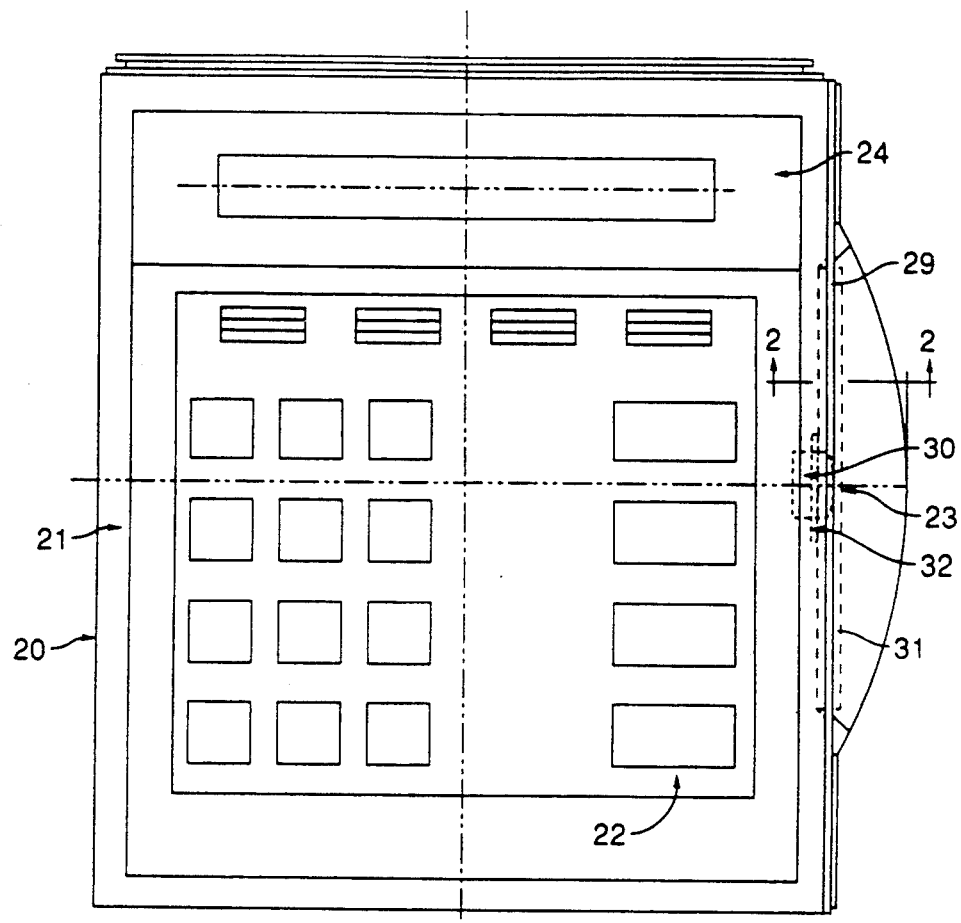
FIG. 1 is a top plan view of a point of sale terminal incorporating card reader apparatus in accordance with this invention.
Figure 2:
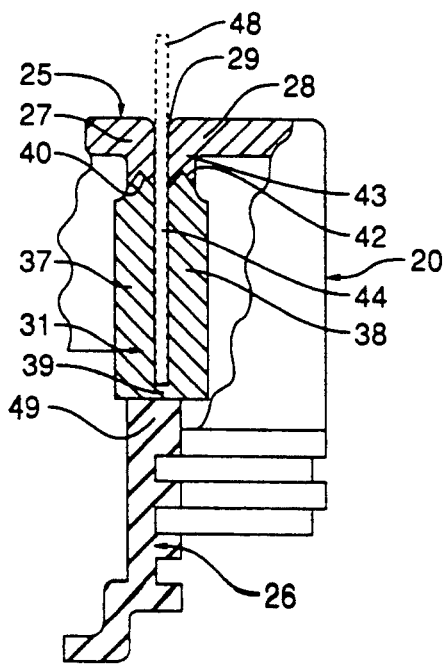
FIG. 2 is a partial section view of card reader apparatus in accordance with this invention and taken along the lines 2—2 in FIG. 1.
Figure 19:
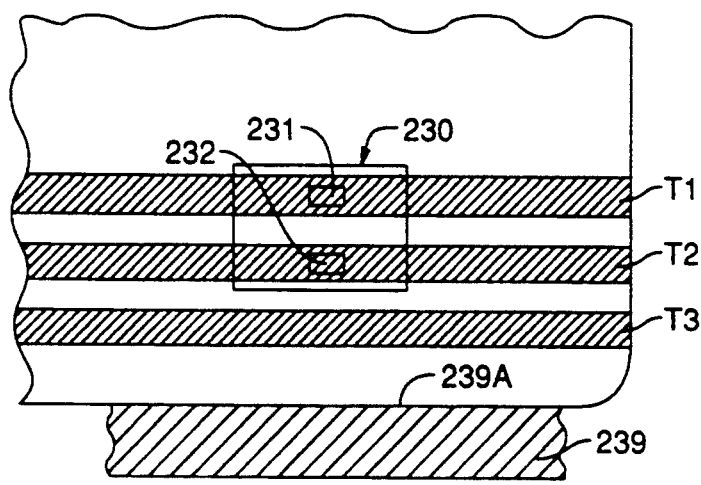
FIGS. 19 and 20 illustrate one embodiment of a card reader subassembly in accordance with this invention for providing the selective data track reading feature of this invention.
Figure 20:
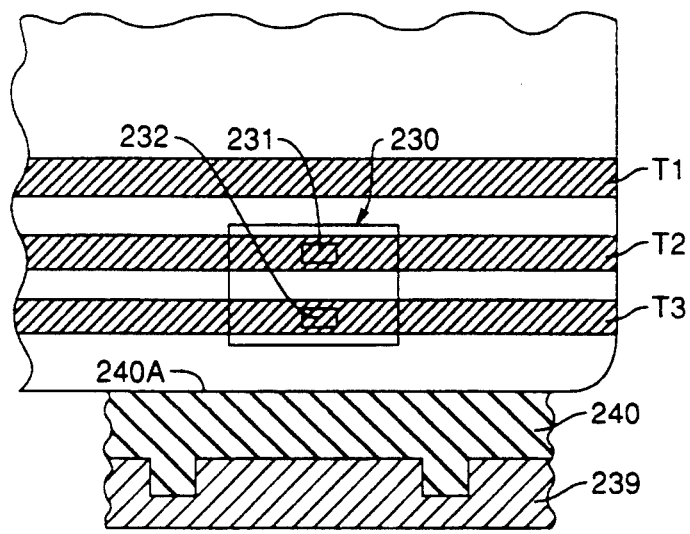

Referring now to FIGS. 1-5, the elements of this invention are shown as comprising an apparatus 20 having a reader subassembly 23 for reading a data carrier 48 (FIG. 2). Apparatus 20 in this embodiment is in the form of a point of sale transaction automation terminal. Data carrier 48 as shown here is a plastic card, e.g. a credit card or a debit card or other form of data card, which carries a magnetic stripe having one or more data tracks thereon. FIGS. 19 and 20 illustrate such a card having up to three data track locations thereon. It should be understood that this invention is adaptable to use with various forms of data carriers in addition to data cards with magnetic stripes thereon, such as, for example, a data carrier with a bar code thereon or a data carrier, such as a check, with MICR bank account and identification data thereon.

Apparatus 20 includes a housing 21 which defines a guide slot location 29 for data carrier 48. A transducer in the form of magnetic read head 30 is provided for reading data stored on a data stripe on data carrier 48. A data carrier guide in the form of card guide 23 is removably mounted to housing 21 at data carrier slot location 29. Card guide 23 has a bottom wall portion 39 and a major side wall portion 37 and defines an access window (50 in FIG. 10). A mounting arrangement 32 is provided for mounting magnetic read head 30 at a prearranged location within access window 50 for accurate detection of data on the data stripe of data carrier 48 when it is manually swiped through guide slot 29.

Housing 21 is preferably formed as an injection molded housing using a material, such as 900 series "Lexan" brand of polycarbonate material. Other plastic materials capable of being injection molded, but meeting laboratory standards for terminal housings could also be used. These materials typically have wear characteristics which make them unsuitable to form the acting surfaces of a card guide, i.e. the surfaces would not withstand the large number of card swipes at which terminals of this type are typically specified.

Card guide 31 may be formed by machining, injection molding, or a combination of extruding and machining a material such as ultra-high molecular weight polyethylene. This is a strong material with good wear characteristics and is capable of withstanding a minimum of several million swipes of a card therethrough without showing substantial surface wear to the point of degrading card reading performance. Preferably, this material has a minimum of five percent by weight of carbon particles dispersed therein to lower the resistivity of the material for static charge control. While this produces a gray or black colored material, card guide element 31 is typically hidden within the housing of the terminal or other device.

The card guide element should be formed with smooth surfaces in the card guide slot region 44 so as to minimize wear on the data card passing therethrough.

Other materials with sufficient wear resistance could also be used for forming card guide element 31. For example, a material such as nylon 6/6 with thirty percent short glass fibers as well as a minimum of five percent of carbon particles dispersed therein could be employed.

Figure 3:
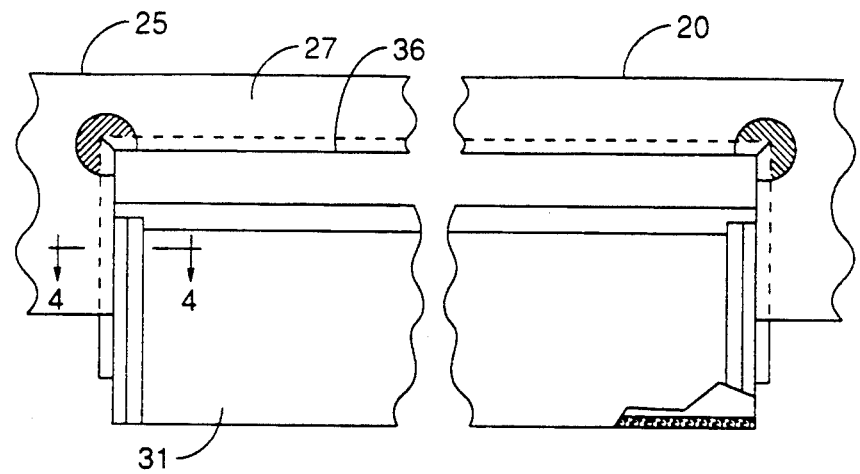
FIG. 3 is a partial assembly view showing the structure and mounting of a card guide element of card reader apparatus in accordance with this invention.
Figure 4:
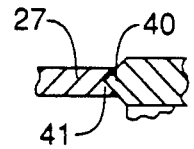
FIG. 4 is a partial section view taken along the lines 4—4 in FIG. 3.

Point of sale terminal 20, which incorporates features of this invention, includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies (not shown) that are mounted therewithin. Removable card guide 31 is mounted in a rectangular opening 36 formed in side wall portion 27 of top enclosure section 25. As shown in FIGS. 3 and 4, each of the edge sections 41 that define rectangular opening 36 have a groove formed therein that cooperates with a tongue formed on edge portions 40 of side wall 37 of card guide 31. Thus side wall 37 as adapted to be removably mounted in opening 36 by sliding it in from the bottom of the opening.

Figure 5:
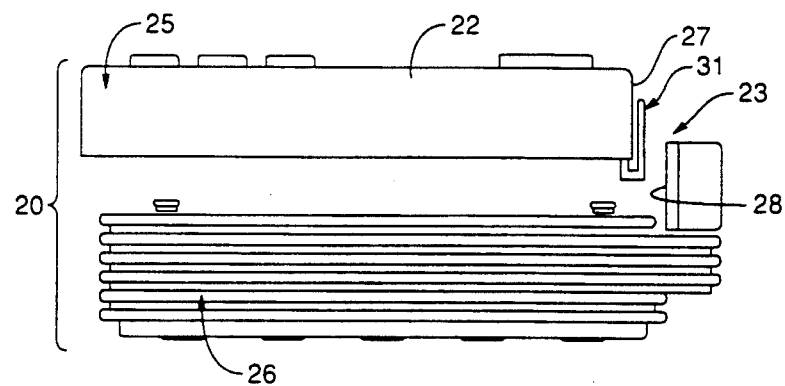
FIG. 5 is an exploded view of the terminal housing arrangement and card guide arrangement in accordance with one embodiment of this invention.

As shown in FIG. 2, side wall portion 28 of bottom enclosure section 26 and side wall portion 27 of top enclosure section 25 define card guide location 29. The active card guide slot 44 at the card reading location associated with read head 30 is, however, defined by side wall sections 37 and 38 and bottom wall section 39 of card guide 31. The upper edge of side wall section 38 has an outwardly extending tongue 42 formed thereon and this tongue cooperates with an associated groove 43 formed in side wall portion 28 to provide a stable, registered mounting relationship therebetween. As shown in FIG. 5, card guide 31 is first mounted to top housing member 25.

To assemble housing 21, the tongue portion 42 is slipped into the groove portion 43 and then top housing member 25 is rotated and snapped together with bottom housing member 26. Bottom wall section 39 of card guide 31 rests on a platform 49 formed on bottom enclosure member 26 to provide full confinement of card guide 31 within housing 21. This tongue and groove mounting arrangement ensures that side walls 37 and 38 of card guide element 31 guide element will be maintained in precisely registered positions and form an accurately dimensioned card guide slot 44. The material of guide slot 31 provides long wear and the removable mounting arrangement provides the opportunity to repair or replace this subassembly if it becomes defective through wear or other causes.

Figure 6:
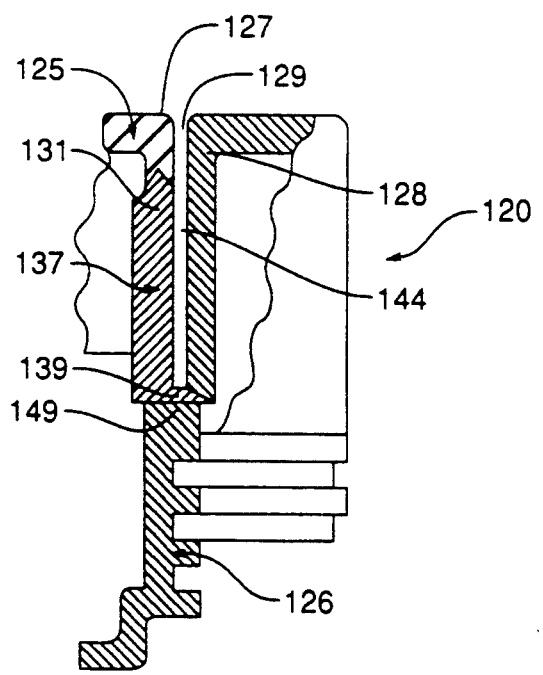
FIG. 6 is a partial section view illustrating an alternative embodiment of a card reader apparatus in accordance with this invention.

FIG. 6 illustrates an alternative embodiment in the form of a terminal 120 with generally similar overall structure but with a variation in the card guide element 131. In this embodiment card guide element 131 is formed as one sidewall member 137 and a bottom wall member 139, which together with side wall 128 provided on bottom enclosure member 126 of the terminal housing define an accurate card guide slot 144 at slot location 129. Other structural and functional features and characteristics of this embodiment are essentially the same as the embodiment shown in FIGS. 1-5 and described above.

Figure 7:
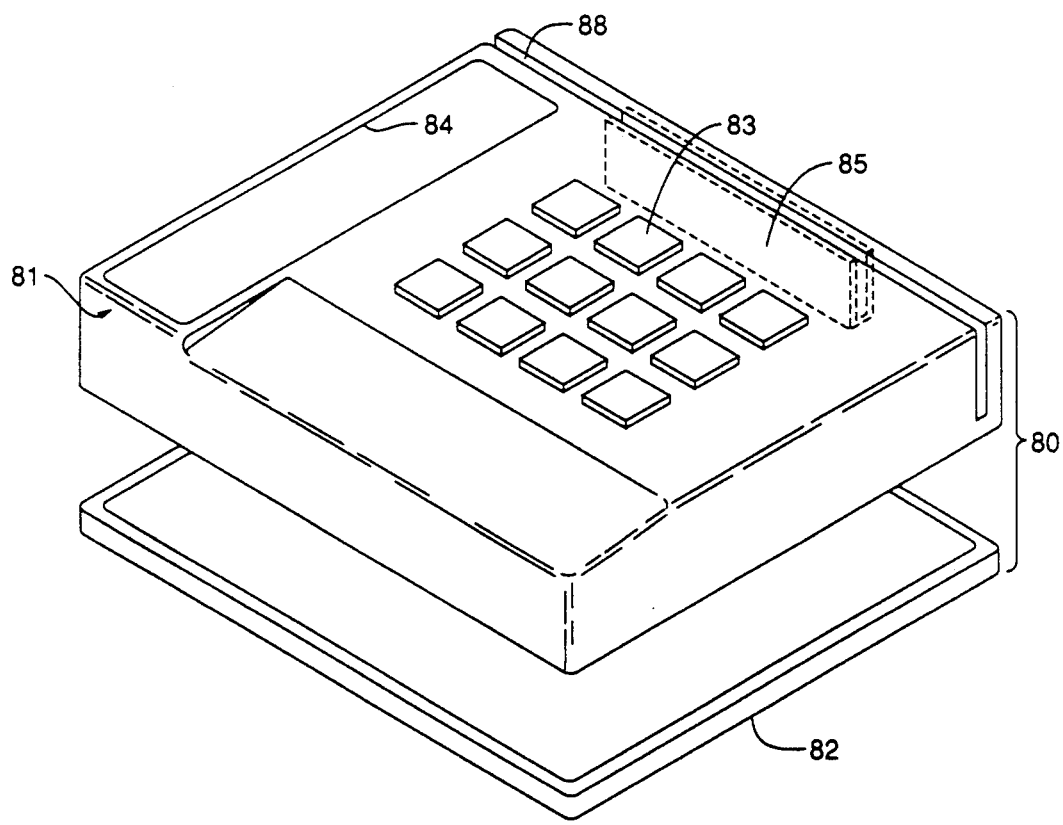
FIG. 7 is an exploded perspective view of an alternative embodiment of a point of sale terminal incorporating a card reader subassembly in accordance with this invention.
Figure 8:
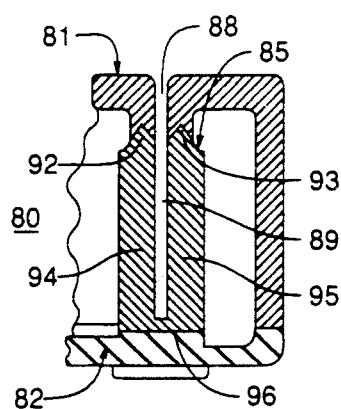
FIGS. 8 and 9 are partial section views showing an alternative embodiment of a card guide element in accordance with this invention and an alternative mounting arrangement useful for the terminal type shown in FIG. 7.
Figure 9:
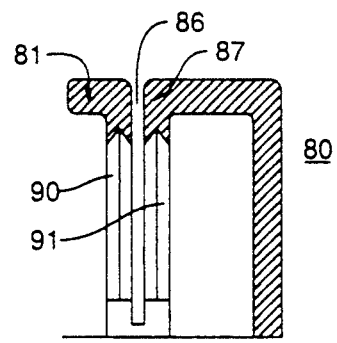

Referring now to FIGS. 7-9, an alternative embodiment of a point of sale terminal employing this invention will be described. In this embodiment, housing 80 is formed from a top enclosure member 81 and a bottom enclosure member 82 with top enclosure member 81 carrying a keyboard subassembly 83 and a display subassembly 84. In this embodiment guide slot location 88 is defined entirely within top enclosure member 81. As shown in FIGS. 8 and 9, card guide element 85 of the card reader subassembly of this invention is inserted into two rectangular apertures defined in side wall portions 86 and 87 using a tongue and groove arrangement similar to that of the previously described embodiment. Grooved edge portions 90 and 91 cooperate with tongue portions 92 and 93 on three edge portions of side wall members 94 and 95 to provide a secure registered mounting position for card guide 85 and an accurately dimensioned card guide slot 89. A platform 96 formed on bottom enclosure member 82 is provided to secure card guide element 85 within housing 80 when the top and bottom enclosure members are assembled together with the card guide element. This overall arrangement facilitates easy removal and replacement of the card guide element and the overall card reader subassembly if the need arises.

Figure 10:
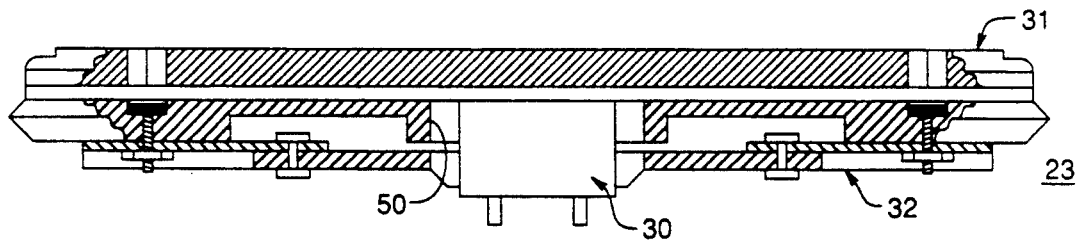
FIG. 10 is a partial section view of a data carrier reader subassembly in accordance with the general principles of this invention.
Figure 11:
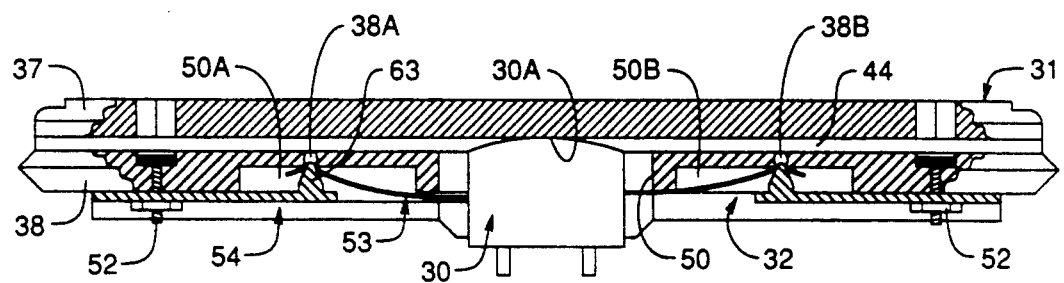
FIG. 11 is a partial section view of a magnetic data card reader subassembly in accordance with one embodiment of this invention.

FIG. 10 illustrates the general components of a reader subassembly 23 in accordance with this invention which is adapted to for mounting to a housing at a defined guide slot location to facilitate reading a data carrier having data stored on at least one data track. Reader subassembly 23 comprises a guide means 31 which is adapted for removable mounting to the housing at the defined guide slot location, a transducer means 30 for detecting data stored on a data track of a data carrier, and a mounting means 32. Mounting means 32 mounts transducer means 30 within an access window 50 formed in one side wall portion of guide means 31. The particular structure and function of mounting means 32 and the structure and function of transducer 30 are dictated by the characteristics of the data carrier and the data recording method employed thereon. As previously mentioned, the data carrier may have a bar code thereon and transducer 30 may be an optical bar code reader device. Another alternative would be a MICR check date line on a bank check or draft, with transducer 30 taking the form of an optical character recognition head or magnetic head for MICR data reading.

FIGS. 11-18 illustrate in greater detail card guide element 31 and a preferred form of a mounting arrangement for a read head 30 in the form of a magnetic read head. In this embodiment, mounting arrangement 32 comprises leaf spring 53 and clamp 54. As shown best in FIGS. 16 and 17, leaf spring 53 has a pair of mounting ears 55 formed thereon and the housing of read head 30 is fastened to mounting ears 55 using, for example, a pair of spot welds 56 on each ear. A pair of mounting apertures 57 in leaf spring 53 cooperate with a pair of projections 63 on clamp 54 and a pair of apertures 38A and 38B in side wall member 38 of card guide 31 to mount leaf spring 53 in an accurate location on side wall 38. When so mounted, a forward portion of read head 30 extends through access aperture 50 in side wall member 38.

Projections 63 on clamp or bracket 54 cooperate with apertures 57A and 57B in leaf spring 53 to introduce an initial biasing spring force into the leaf spring by deforming the end portions into depressed regions 50A and 50B in side wall member 38. This biasing spring force urges the front surface 30A of transducer 30 toward the opposite wall surface of card slot 44 and sets the spring pressure which maintains the read head in contract with the magnetic stripe on a data card passing through the card slot 44.

Mounting aperture 57B is slotted to provide an adjustable mounting relationship with the projection 63 of clamp 54 extending therethrough to take up changes in effective leaf spring length as the clamp is initially assembled to the card guide element and as the position of the read head 30 changes when a card is passed through the card slot. This leaf spring and clamp mounting arrangement permits the read head 30 to rotate slightly relative to adjust the read head contact with a warped data card.

As shown a threaded stud and nut mounting arrangement 52 cooperates with the mounting apertures 62 in clamp 54 to mount the clamp to the card guide element 31. Access apertures are provided through side wall member 37 to permit a press fit stud to be seated in a recess formed in side wall member 38 with the threaded stud extending through side wall member 38 to receive the clamp and the nut for fastening these two pieces together in the manner depicted.

This invention also features an arrangement for readily modifying the reader subassembly to provide two selectably configurably reading arrangements for either one of two or two of three tracks of data. As previously mentioned a one of two data track arrangement might involve two possible locations of a bar code on a data card. A two of three track reading situation may involve a data card that has three parallel data tracks, such as a magnetic card that has three possible magnetic data track locations as shown in FIG. 19.

Figure 12:
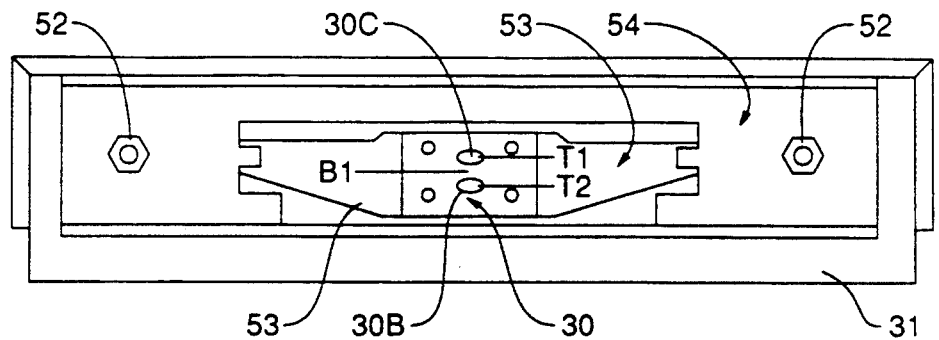
FIGS. 12 and 13 are side elevational views of alternative subassembly mounting arrangement for one embodiment of a card reader subassembly in accordance with this invention.
Figure 13:
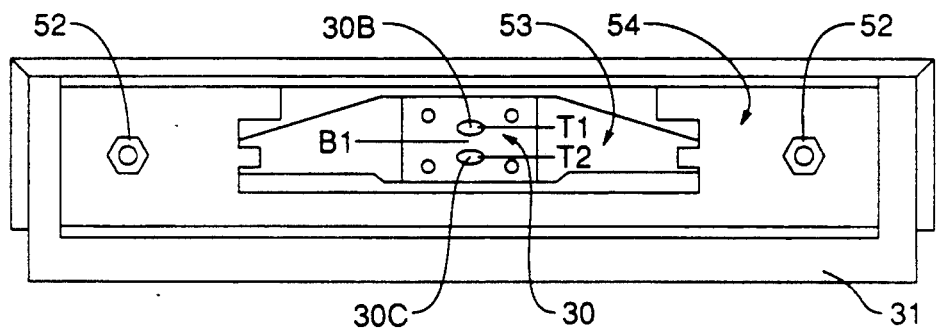
Figure 14:
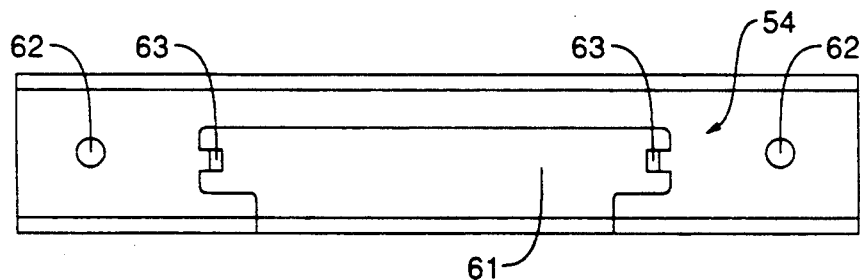
FIGS. 14 and 15 are side and end views of a clamp or bracket member employed in one embodiment of a card reader subassembly in accordance with this invention.
Figure 15:
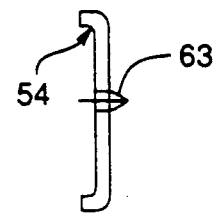
Figure 16:
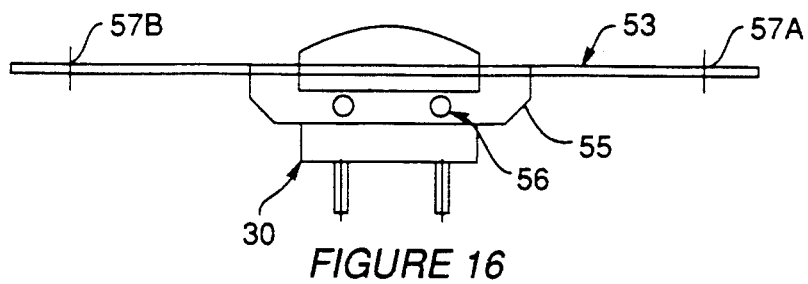
FIGS. 16-18 are top, side and end views of a leaf spring and magnetic read head assembly for one embodiment of a magnetic data card reader subassembly in accordance with this invention.
Figure 17:
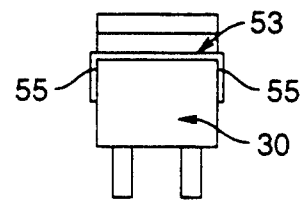

As shown best in FIG. 14, clamp member 54 has a central open area 61 where leaf spring 53 is carried. As shown in FIGS. 12 and 13, clamp 54 may be mounted to card guide element 31 in either of two selectable orientations, one shown in FIG. 12 and the other in FIG. 13. As shown in FIGS. 12 and 13 the clamp 54, the leaf spring 53 and the mounting arrangement 52 define a reference mounting line L1. Leaf spring 53 is formed such that one of the two magnetic pick up elements, i.e. pickup element 30C, the one for track two (T2) of a three track data card will be positioned substantially on the reference mounting line L1 regardless of which one of the two mounting orientations shown in FIGS. 12 and 13 is utilized. The second pickup element 30B is displaced away from the reference mounting line L1 by substantially the distance between the two magnetic data tracks on a data card. Thus in the clamp and spring orientation shown in FIG. 12, pickup element 30B is closer to the bottom wall of the card slot 44 than the reference mounting line L1 and thus in a position to read track three (T3) on a data card. In the inverted position of the clamp and leaf spring arrangement shown in FIG. 13, pickup element 30B is further away from the bottom surface of card slot 44 and thus in position to read track one (T1) on a data card.

Reference lines B1 and B2 on FIGS. 12 and 13 designate how a single reader element, such as for a bar code reading transducer arrangement could be displaced away from reference mounting line L1 and thus be positioned alternatively above or below that line for reading bar codes at different positions on a data carrier depending on the selected one of the two possible orientations of the clamp mounting arrangement.

It should be noted that clamp 54 could also be designed to have a symmetrical opening 61 such that the mounting orientation of the leaf spring 53 alone relative to claim 54 would determine the position of read head 30 relative to the bottom wall of the card slot.

FIGS. 19 and 20 illustrates another feature of this invention in the form of an alternative approach to altering the spacing between magnetic read head 230 and the bottom wall 239A of the card slot defined by a bottom wall segment 239 of a card guide member. As shown in FIG. 20, card guide element 239 is adapted to receive an optional card slot insert member 240 mounted within the card slot. member to alter the position of the bottom wall of the card guide slot. With card slot insert member 240 absent as shown in FIG. 19, a card 240 swiped through the slot will have tracks 1 and 2 (T1, T2) in position to be read by pickup elements 231 and 232 on read head 230, but track 3 (243) will not be read.

Alternatively, with card slot insert member 240 mounted in the position shown and having a suitable thickness as shown, a card 250 swiped through the card slot will have the lower pair of tracks T2 and T3 aligned for reading by pickup elements 231 and 232 track T1 will not be read.

FIGS. 19 and 20 show only a portion of the bottom wall member of the card guide element in each case. However, it should be apparent that any of the configurations of the card guide elements shown in FIGS. 2, 6, 9, and 10 are adaptable to employing this feature of the invention. While FIGS. 19 and 20 relate this feature particularly to use of a dual track magnetic pick up head for reading a magnetic stripe data card, it should be apparent that this feature can be adapted generally for reading single data tracks at different locations on a data card. The data tracks may be magnetic or optical data using appropriate transducer elements in each case.

Figure 18:
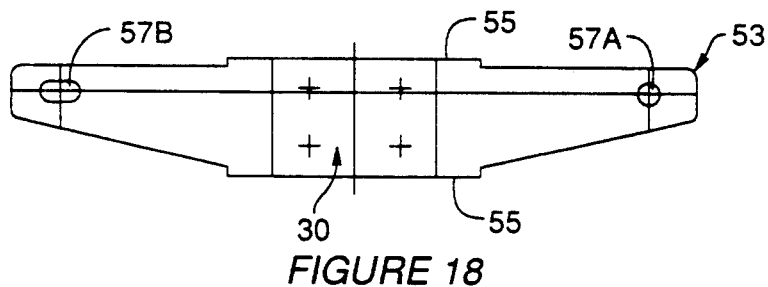
Figure 21:
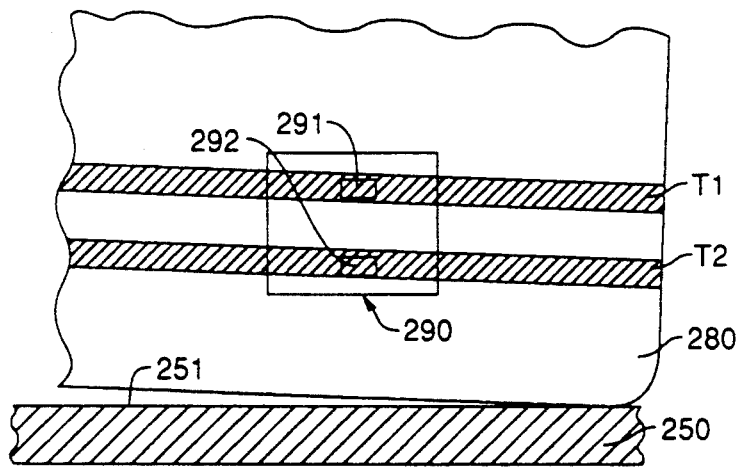
FIGS. 21 and 22 illustrate a tapered card guide bottom feature in accordance with one embodiment of this invention.
Figure 22:
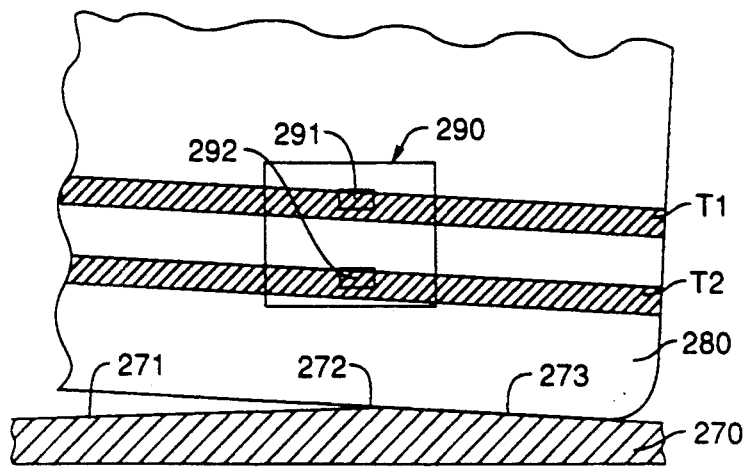

Referring now to FIGS. 21 and 22, another feature of this invention is shown as comprising a card guide with a bottom wall section configured to define a bottom card guide wall which is tapered downwardly from a point associated with the reading position, i.e. the position of the reading transducer. The reading position is generally defined, as shown in FIG. 18, by the mounting position of a read head, such as magnetic read head 290. Other types of reading transducers may also be utilized in connection with this feature.

Especially in a card reader terminal having a short card slot, i.e. on the order of the length of a data card itself or less, there is a problem with a card swiped at an angle through the card slot is sometimes encountered. As shown in FIG. 21, with reference to a card slot with a straight bottom wall configuration, a slightly tilted card may position one or more of the data tracks T1, T2 out of alignment with the magnetic pick up elements 291 and 292 during a substantial portion of the scan of the data track and thereby cause an erroneous read. This forces the operator to reswipe the card with greater care as to card angle and flatness in the slot to obtain an accurate read.

By providing a downwardly tapered card slot bottom wall, as shown in FIG. 22, more leeway for registering a card swiped at an angle is provided. A corner of the card being swiped at an angle will be displaced below the apex of the tapered slot and this will tend to bring the read head pick up elements into alignment with the data tracks for accurate reading of data. The high point of the tapered bottom surface beneath the active read head location provides a reference point which the operator can utilize to contact the bottom edge of the data card during the swiping operation. A taper of between one and three degrees has been found to be effective to improve card reading accuracy in a card slot of a length of about two to four inches relative to reading a standard plastic credit card with dual track magnetic data stripe thereon.

The features of this invention have been described above in connection with several alternative embodiments. These are provided by way of example of the general principles of this invention and it should be understood that numerous other variations and different embodiments could be employed.

For example, while the invention has been described particularly in connection with incorporating it within a point of sale terminal, it should be understood that the invention may be applicable to a number of forms of apparatus that need a manual card reader capability. For example, the invention could be employed in a standalone card reader module which is adapted to be coupled to a point of sale terminal. In such an embodiment, the card guide element would still be mounted to a housing but overall the housing would be smaller and not enclose as many electronic modules and subassemblies.

It should also be understood that this invention could be used in embodiments that employ multiple transducers in a side by side or tandem arrangement. For example, a data carrier reader subassembly might integrate a magnetic stripe read head with a bar code read head. The two read heads might function to read two types of recorded data on the same card during a single swipe of the card. Alternatively, this arrangement might be used to read different data tracks on different types of data carriers. For example, the same card reader device might be used to read magnetic stripes on traditional credit or debit cards using a magnetic read head and also incorporate a bar code reader for reading bar codes on identification cards, e.g. for purposes of time and attendance monitoring or medical payment system or other data collection operations or transactions.

It should thus be apparent that numerous alternations and adaptations of the invention are possible and the above described embodiments should be considered to be examples and not limitations. Persons of skill in this art could make numerous other modifications without departing from the scope of the invention as set forth in the following claims.

What is claimed is:

1. A point of sale terminal with a built-in data card reader, said terminal comprising
    a housing having wall portions defining a card entry section and a card exit section of a card guide and further defining a central card guide gap extending between said entry section and said exit section;
    a card reader subassembly mounted to said housing and comprising a central card guide section having a read head window formed in one side wall thereof, a read head for reading data on a data card, and a read head bracket for mounting said read head to said central card guide section with said read head extending through said read head window,
    said entry section and said exit section of said card guide having inwardly facing edge wall portions located adjacent said central card guide gap and shaped to form one of a mounting tongue or groove arrangement and cooperating with an associated mounting tongue or groove arrangement formed on outwardly facing edge wall portions of said central card guide section to provide a slidable tongue and groove mounting relationship for said central card guide section to be inserted in said central card guide gap so that said central card guide section and said card entry section and card exit section together form a complete card guide.

2. Apparatus as claimed in claim 1, wherein said housing means is an injection molded housing comprising a plastic material which has unsuitable wear resistance characteristics to serve as the material of a bottom wall of said guide slot, and said central card guide section is formed from a plastic material having substantially greater wear resistance characteristics.

3. Apparatus as claimed in claim 1, wherein
    said data card has first and second separated data tracks thereon at prearranged first and second distances from a bottom edge of said data card;
    said read head has at least one read element for reading one of said data tracks and being positioned at a prearranged location;

said read head bracket selectively mounts said read head in one of a first orientation and second orientation inverted from said first orientation and includes fastener means cooperating with said central card guide section to define a reference mounting line relative to each of said read head bracket and said central card guide section at a prearranged distance from a bottom wall of said central card guide section, said prearranged distance corresponding substantially to the average of said first and second distances, said read head bracket carrying said read head in a prearranged position with said one read element displaced from said reference mounting line by a prearranged displacement distance corresponding substantially to one half the difference between said first and second distances, whereby said one read element is positioned to read said first data track when said read head bracket is mounted in said first orientation and said one read element is positioned to read said second data track when said read head bracket is mounted in said second orientation.

4. Apparatus as claimed in claim 1, wherein
said data card is a plastic data card having a magnetic track thereon;
said central card guide section has a pair of location apertures formed therein adjacent said read head window;
said read head bracket includes a leaf spring means carrying said read head and having a pair of mounting apertures on end portions thereof; and clamp means for mounting said leaf spring element and said read head carried thereon to said central card guide section, said clamp means including a pair of spring mounting means cooperating with said mounting apertures in said leaf spring means and said location apertures to mount said read head in a registered location in said read head window, said leaf spring urging a front surface of said read head into said central card guide section and into contact with the surface of a magnetic track on a data card being manually swiped through said card guide.

5. Apparatus as claimed in claim 4, wherein
said magnetic track on said data card defines three separated magnetic data track locations;
said read head has two separated magnetic pick up heads for simultaneously detecting magnetically encoded data on two of said three separated magnetic data track locations; and
said location apertures in said central card guide section, said mounting apertures in said leaf spring element and said spring mounting means on said clamp means being positioned such that said leaf spring element and said clamp means may be mounted to said central card guide section in one of respectively inverted first and second orientations, said first orientation positioning said magnetic pick up heads on said read head for detecting data on the upper two of said magnetic data track locations as said data card is manually swiped through said card guide, and said second orientation positioning said magnetic pick up heads on said read head for detecting data on the lower two of said magnetic data track locations as said data card is manually swiped through said card guide.

6. Apparatus as claimed in claim 4, wherein
said magnetic track on said data card defines three separated magnetic data track locations;
said read head has two separated magnetic pick up heads for simultaneously detecting magnetically encoded data on two of said three separated magnetic data track locations;
said read head bracket mounts said read head within said read head window at a registered location such that said separated magnetic pick up heads are positioned relative to said bottom wall of said guide slot for detecting data on the upper two of said magnetic data track locations; and
a wall insert member is mounted on said bottom wall of said central card guide section to alter the position of said bottom wall of said card guide relative to said read head such that said separated magnetic pick up heads are positioned for detecting data on the lower two of said magnetic data track locations.

7. Apparatus as claimed in claim 1, wherein
said data card is a plastic card carrying said data track thereon and having at least one data track of prearranged width defined on said data track;
said read head includes a detector element having a data pick up area with a height dimension generally comparable to said prearranged width of said data track; and
said central card guide section has a bottom wall portion having an upper surface tapering downwardly from a point directly underneath said read head window such that a data card being swiped through said card guide is more likely to have sufficiently accurate registration between said detector element and said data track for accurate detection of data thereon.

* * * * *